(12) United States Patent  (10) Patent No.: US 7,808,591 B2
Karman et al.  (45) Date of Patent: Oct. 5, 2010

(54) IMAGE QUALITY IN AN IMAGE DISPLAY DEVICE

(75) Inventors: Gerardus P. Karman, 'S-Hertogenbosch (NL); Volker Schoellmann, Dusseldorf (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1159 days.

(21) Appl. No.: 10/571,823

(22) PCT Filed: Sep. 9, 2004

(86) PCT No.: PCT/IB2004/051722

§ 371 (c)(1),
(2), (4) Date: Mar. 15, 2006

(87) PCT Pub. No.: WO2005/029872

PCT Pub. Date: Mar. 31, 2005

(65) Prior Publication Data

US 2006/0279680 A1 Dec. 14, 2006

(30) Foreign Application Priority Data

Sep. 20, 2003 (GB) .................. 0322060.5
Dec. 12, 2003 (GB) .................. 0328955.0

(51) Int. Cl.
*G02F 1/133* (2006.01)
(52) U.S. Cl. ................... 349/116; 349/117; 349/118; 349/119; 349/120; 345/32; 345/87
(58) Field of Classification Search .................. 345/32, 345/87; 349/18
See application file for complete search history.

(56) References Cited

U.S. PATENT DOCUMENTS

| 6,169,590 | B1 * | 1/2001 | Abileah et al. | 349/120 |
| 6,172,807 | B1 | 1/2001 | Akamatsu | |
| 6,188,451 | B1 * | 2/2001 | Fujii et al. | 349/15 |
| 6,621,476 | B2 * | 9/2003 | Walton et al. | 345/87 |
| 6,703,989 | B1 * | 3/2004 | Harrold et al. | 345/32 |
| 6,765,545 | B2 * | 7/2004 | Son et al. | 345/7 |
| 7,623,090 | B2 * | 11/2009 | Ijzerman et al. | 345/32 |

(Continued)

FOREIGN PATENT DOCUMENTS

| HU | 216046 B | 2/1992 |
| HU | 63503 A2 | 8/1993 |

OTHER PUBLICATIONS

G. P. Karman, et al: P-37: Increasing the Viewing Angle of Multidomain LCDs by Using Patterned Ratarders, 2002, pp. 515-517.

(Continued)

*Primary Examiner*—Richard Hjerpe
*Assistant Examiner*—Jeffrey S Steinberg

(57) ABSTRACT

A display device for displaying a three dimensional image such that different views are displayed according to the viewing angle. The display device includes a display panel having separately addressable pixels for displaying the image, where the pixels are grouped such that different pixels in a group correspond to different views. The display device further includes a retarder in optical association with the display panel. The retarder includes retarder pixels, where at least one retarder pixel is associated with each corresponding pixel in the display panel. Optical parameters of the retarder pixels are varied as function of the viewing angle associated with the corresponding pixel in the display panel.

22 Claims, 5 Drawing Sheets

U.S. PATENT DOCUMENTS

2006/0279547 A1  12/2006  Karman et al.
2007/0040778 A1   2/2007  Karman et al.
2007/0041096 A1   2/2007  Nieuwkerk et al.
2007/0052699 A1   3/2007  Karman et al.

OTHER PUBLICATIONS

K. Takatori, et al: S15-6 A Complementary TN LCD with Wide-Viewing-Angle Grayscale, Jan. 1992, pp. 591-594, XP000472745.

* cited by examiner

IMAGE QUALITY IN AN IMAGE DISPLAY DEVICE

The present invention relates to display devices, and in particular to display devices adapted to display three dimensional or stereoscopic images.

The generation of the three-dimensional images generally requires that a display device is capable of providing a different view to the left and the right eye of a user of the display device. This can be achieved by providing a separate image directly to each eye of the user by use of specially constructed goggles. In one example, a display provides alternating left and right views in the time sequential manner, which views are admitted to a corresponding eye of the viewer by synchronised viewing goggles. In contradistinction, the present invention relates to classes of display devices where different views of an image can be seen according to the viewing angle relative to a single display panel. Hereinafter, these will be referred to, generally, as 3D display devices. It is to be understood, however, that the invention may also relate to so-called multi-view display devices which, whilst providing a plurality of views to one or more users, do not necessarily provide a stereoscopic image.

In another example, such as that described in U.S. Pat. No. 6,172,807, time sequential synchronisation of left and right eye views is provided by way of a spatial modulation element in the form of an LCD panel which alternately occludes left and right eye views of a display using parallax. In order to correctly occlude left and right eye views, the system of U.S. Pat. No. '807 has to constantly track the position of the viewer relative to the display device.

In contradistinction, the present invention relates to classes of display devices where different views of an image can be seen according to the viewing angle relative to a single display panel without necessarily requiring tracking of user position. Hereinafter, these will be referred to generally as 3D display devices.

One known class of such 3D display devices is the liquid crystal display in which the parallax barrier approach is implemented. Such a system is illustrated in FIG. 1.

With reference to FIG. 1, a display device 100 of the parallax barrier type comprises a back panel 11 that provides a plurality of discrete light sources. As shown, the back panel 11 may be formed by way of an areal light source 12 (such as a photoluminescent panel) covered with an opaque mask or barrier layer 13 having a plurality of slits 14a to 14d distributed across its surface. Each of the slits 14 then acts as a line source of light.

A liquid crystal display panel (LCD) 15 comprises a plurality of pixels (e.g. numbered 1 to 10 in FIG. 1) which are separately addressable by electrical signals according to known techniques in order to vary their respective light transmission characteristrics. The back panel 11 is closely positioned with respect to the LCD panel 15 such that each of the line pixels 1 to 5 shown as group $16_1$ correspond to slit 14a, pixels 6 to 10 shown as group $16_2$ correspond to slit 14b, etc.

Each pixel of group 16 of pixels corresponds to one view V of a plurality of possible views ($V_{-2}$, $V_{-1}$, $V_0$, $V_1$, $V_2$) of an image such that the respective line source 14a can be viewed through one of the pixels 1 to 5 corresponding to that view. The number of pixels in each group 16 determines the number of views of an image present, which is five in the arrangement shown. The larger, the number of views, the more realistic the 3D effect becomes and the more oblique viewing angles are provided.

Throughout the present specification, we shall refer to the 'image' being displayed as the overall image being generated by all pixels in the display panel, which image is made up of a plurality of 'views' as determined by the particular viewing angle.

A problem exists with this prior art arrangement. The light transmission coefficient of each pixel in the LCD panel is strongly dependent upon the viewing angle. Thus, the viewed intensity of source 14a will appear different for different views. For example, $V_0$ will be different to $V_2$. Thus, the viewed intensity of the source will appear different for different viewing angles.

Conventionally, the perceived intensity of the viewed source for any particular element in an image is an important function of properly rendering grey scales in the image. A conventional display system will provide drive signals to each pixel of a display panel so as to vary its transmission coefficient such that a desired grey scale level is achieved for that element of the image. For the 3D display device described above, if each pixel 1-5 is driven at the same voltage, corresponding to the required grey scale for that element of the image, the resulting grey scale image will be a function of viewing angle. This results in sub-optimal image and unwanted grey scale artefacts when observing the different views of the image.

It is an object of the present invention to overcome or mitigate the unwanted grey scale and contrast artefacts in a display device for displaying three-dimensional images in which different views of the image are displayed according to the viewing angle.

According to a first aspect of the present invention there is provided a display device for displaying a three dimensional image such that different views are displayed according to the viewing angle, the display device including:

a display panel having a plurality of separately addressable pixels for displaying said image, the pixels being grouped such that different pixels in a group correspond to different views;

a retarder in optical association with the display panel, the retarder comprising retarder pixels, at least one retarder pixel being associated with each corresponding pixel in the display panel, wherein optical parameters of the retarder pixels are varied as function of the viewing angle associated with the corresponding pixel in the display panel.

According to a second aspect of the present invention, there is provided a method for displaying a three dimensional image on a display device comprising the steps of:

forming an image from a plurality of separately addressable pixels in a display panel, the pixels being grouped such that different pixels in a group correspond to different views of the image;

altering the image generated by each of at least some of the pixels as a function of the viewing angle associated with each pixel.

By means of the present invention, it is possible to achieve negligible grey scale inversion together with good contrast at all viewing angles.

It is well known that the image quality for an LCD panel strongly depends on the viewing angle. Particularly for oblique viewing angles, artefacts arise, such as loss of contrast and grey scale inversion.

In a conventional LCD panel, all pixels are driven with voltages between a minimum value (to create a dark state) and a maximum value (to create a white state) or vice versa to produce the different grey scales in the image. This yields good results for viewing angles close to $\phi=0$, but for oblique viewing angles the wrong grey scales are achieved as will be described in more detail herein below.

Known methods which attempt to improve the viewing angle performance, attempt to improve the quality of image for all viewing angles simultaneously. This had been thought necessary because a priori, the location of the user of a conventional LCD display is not known, and therefore the viewing angle under which each pixel is observed is also unknown.

However, the inventors have realised that the situation for 3D displays is different, in that the angular location of the user for any particular view is known, since the view is designed to be generated at a certain viewing angle and not at other viewing angles associated with other views.

Thus, to improve the viewing angle performance in 3D displays, it is not necessary to know the location of the user a priori. What is important, is that each view separately must be optimised, i.e., the contrast and/or brightness should be optimised for only those viewing angles under which that particular view is observed/designed, and not for all viewing angles simultaneously as was the case conventionally.

By means of the present invention, therefore, by varying the optical parameters of the pixels in the retarder on, for example, a pixel by pixel basis, the quality of image produced from each corresponding pixel in the display panel may be improved.

By means of the present invention, therefore, it is possible to improve the image quality for each viewing angle separately and independently.

The invention will now be further described by way of example only, with reference to the accompanying drawings in which.

Figure 1:
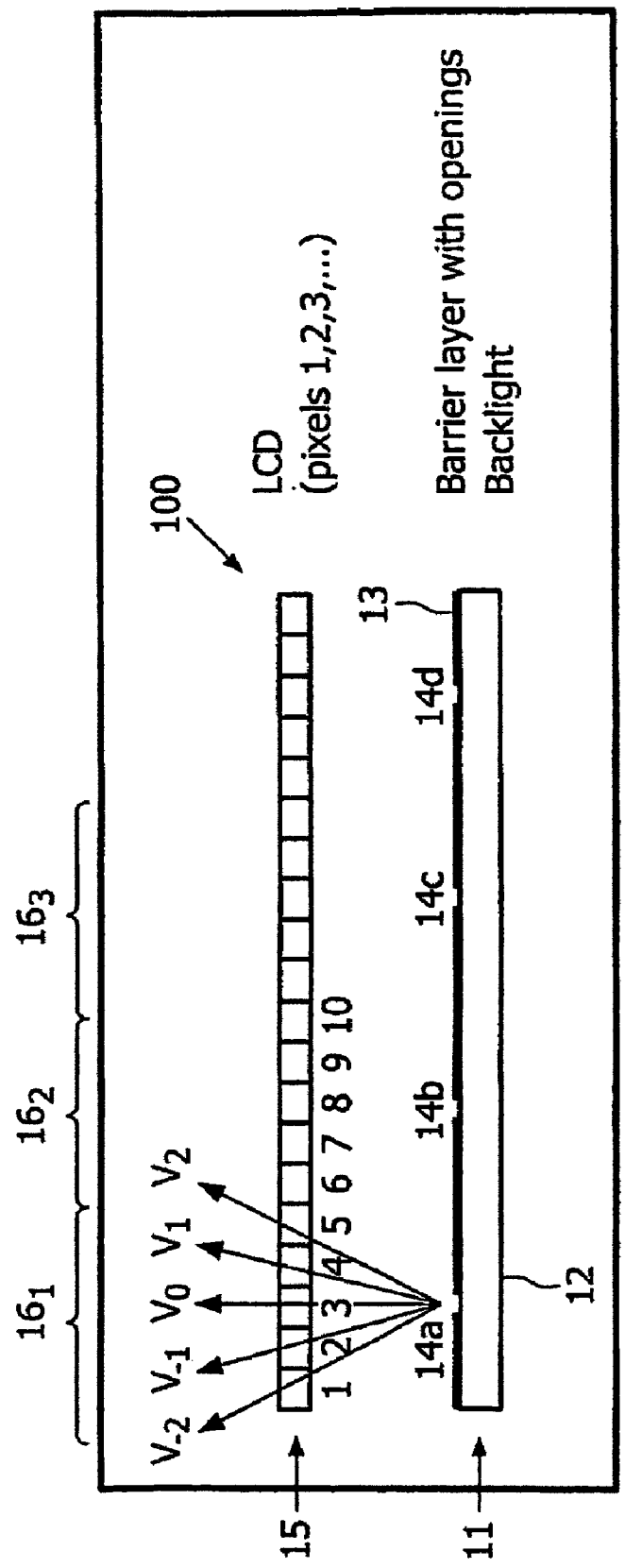
FIG. 1 shows a schematic cross-sectional view of an existing design of LCD device that uses the parallax barrier approach to display three dimensional images.

With reference to FIG. 1, the basic function of a parallax barrier type, three dimensional image display device has already been described. A similar structure of display panel 15 and back panel 11 illumination source may be used in the preferred embodiment of the invention. However, it will be recognised that other configurations may be used as will become evident hereinafter.

In general, the invention uses a display panel 15 having a plurality of separately addressable pixels 1 . . . 10, in which the pixels are grouped so that the different pixels 1 . . . 5 or 6 . . . 10 respectively in a group 16₁ and 16₂ correspond to different views of the image. The display panel 15 may be any suitable electro-optical device in which an optical characteristic of each pixel can be varied according to an electrical control signal to generate an image. Preferably the display panel is a liquid crystal display.

An illumination source having a plurality of discrete light sources 14a . . . 14d, so that each group 16 of pixels is positioned to receive light from a respective one of the light sources, is preferably provided. This may be by way of the areal light source 12 and mask 13 arrangement of FIG. 1, but could also be provided by way of a pixellated light source providing light sources 14 as lines of pixels, individual pixels or blocks of pixels.

Figure 2:
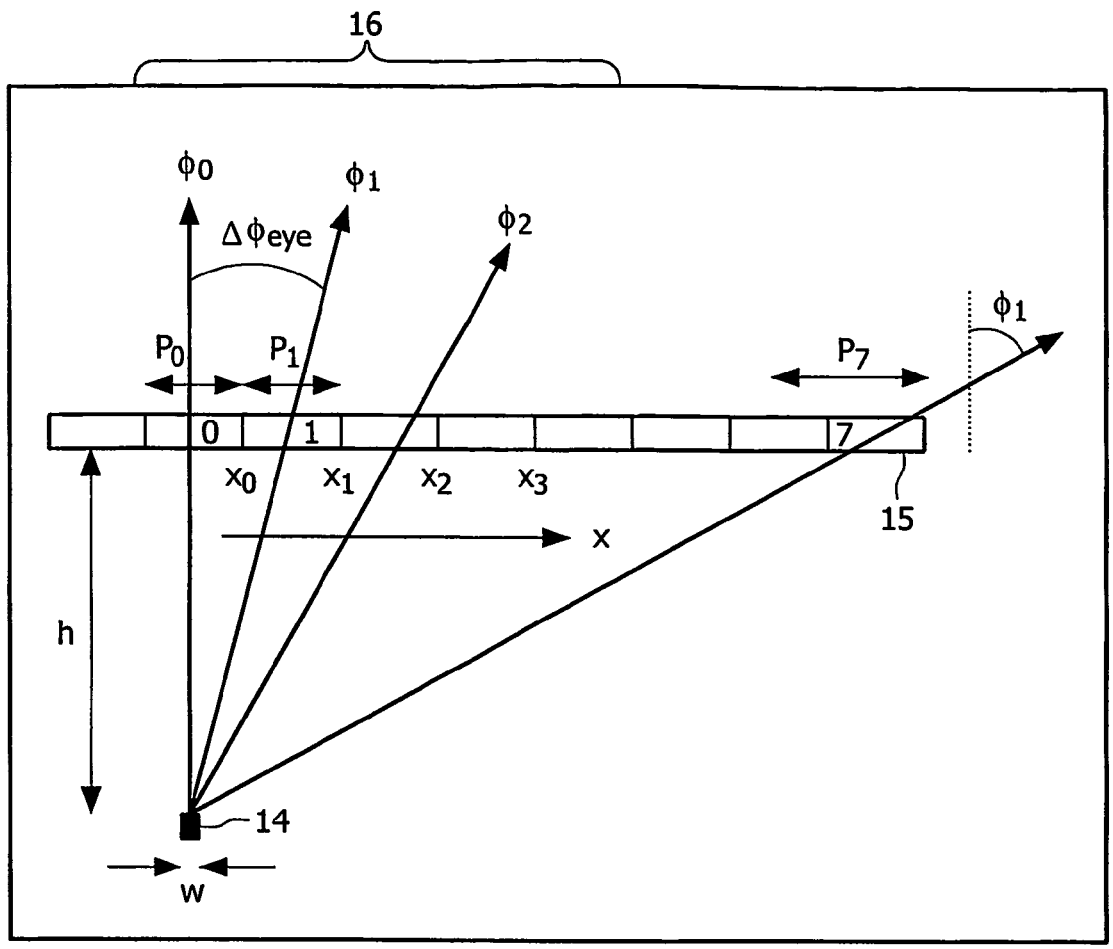
FIG. 2 shows a schematic cross-sectional diagram useful in illustrating the geometry of a parallax barrier LCD device.

Part of a group of pixels in the display panel 15 is shown in FIG. 2. A light source 14 of width w corresponds with, and can be viewed through, a group of pixels 0 . . . 7 at respective viewing angles $\phi_0, \phi_1, \ldots \phi_7$ relative to the normal of the plane of the display panel. It will be understood that only half of the pixel group 16 is shown, a further seven pixels being present to the left of pixel 0 to complete the pixel group 16.

Each pixel has a width $p_0, p_1, \ldots p_7$. Preferably, widths $p_0 \ldots p_7$ are equal, but they could vary in order to compensate to a certain extent for the angle of incidence of light passing therethrough. The distance between the back panel illumination source 14 and the display panel 15 is shown as h. In a preferred display device, h=2.3 mm, $p_0$=200 microns, and w=50 microns although these values may be varied significantly.

Figure 3:
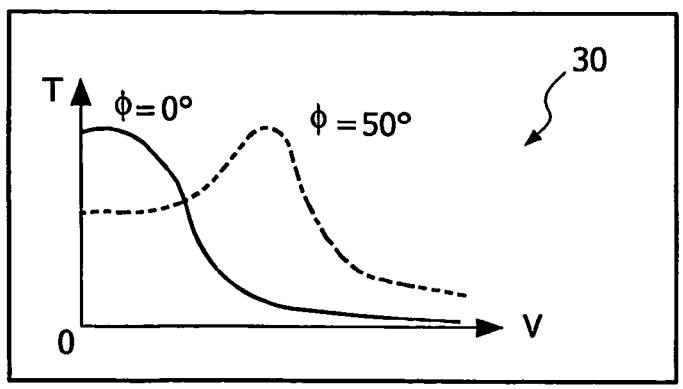
FIG. 3 shows a transmission versus voltage curve for a 90° twisted nematic LCD for viewing angles of $\phi=0°$ (i.e. normal to the surface of the display) and for $\phi=50°$.

FIG. 3 shows transmission (T) versus voltage (V) characteristics 30 for a display panel 15 in the form of a 90 degree twisted nematic LCD. The first curve 31 (solid line) is the T-V characteristic for a viewing angle $\phi=0$ degrees (e.g. pixel 0). The second curve 32 (broken line) is the T-V characteristic for a viewing angle $\phi=50$ degrees (e.g. pixel 5). It will be noted that for a pixel viewed at $\phi=0$, the transmission decreases monotonically with increasing voltage (each value of V corresponds with a certain grey scale). However, for pixel viewed at $\phi=50$ degrees, the T-V curve has a different shape. At $\phi=50$, the mapping between V and the grey scale is completely different, resulting in severe image distortion.

As mentioned hereinabove, to improve the viewing angle performance of 3D displays, it is not always necessary to know the location of the user. The reason is that for 3D displays one has a priori knowledge, namely that a pixel that is generating view n is observed only under viewing angle $\phi=\phi_n$ and not under other angles (in the sense of being sufficiently equal to $\phi_n$ as to not be associated with other views). Therefore, what is important, is that each view separately should be as good as possible. As can be seen in FIG. 2, for example, view n should be optimised for $\phi=\phi_n$ only and not for all $\phi$.

It is still possible to use known methods to improve the viewing angle in a 3D display. However, all known devices and methods are compromises since using such apparatus and methods it is necessary to find a balance between the degree of improvement, and the as large as possible range of viewing angles over which the improvement must be achieved. For 3D LCDs one can benefit from the fact that this requirement can be relaxed, thus enlarging the possibilities for improvement.

By means of the present invention therefore, it is possible to improve the contrast and brightness for a given view (at viewing angle $\phi$). This is achieved by varying the optical parameters of retarder pixels as a function of the viewing angle associated with the corresponding pixel in the display panel.

Preferably, each retarder pixel is associated with a single pixel in the display panel. Alternatively, each retarder pixel may be associated with a plurality of pixels in the display panel. In other embodiments, a plurality of retarder pixels may be associated with a single pixel in the display panel.

The retarder may be positioned either in front or behind the display panel and may be spaced apart from the display panel or may be adjacent to the display panel.

A number of different parameters may be varied in order to improve the contrast and brightness for a given view. For example, the thickness of the retarder may be varied as a function of the viewing angle associated with the corresponding pixel in the display panel.

Alternatively, the orientation of director molecules that constitute the retarder pixels may be varied. In this respect, the tilt angle, the azimuthal angle or the splay and bend profile may be varied.

In other embodiments, the refractive indices of the retarder pixels may be varied as a function of the viewing angle associated with the corresponding pixel in the display panel. In this respect, the birefringence of the retarder pixels may be varied.

In some embodiments, more than one optical parameter may be varied in one or more of the retarder pixels. Advantageously, the same optical parameter is varied in all of the retarder pixels, but in some embodiments a different optical parameter may be varied in each of the retarder pixels.

The retarder pixels may comprise all pixels in the retarder, or alternatively they may comprise only some of the pixels in the retarder.

Referring now to FIGS. 4a, 4b, 5 and 6, an embodiment of the invention in which the tilt angle of the director molecules of the retarder pixels is varied as a function of the viewing angle associated with the corresponding pixel in the display panel will be described in detail.

Figure 4:
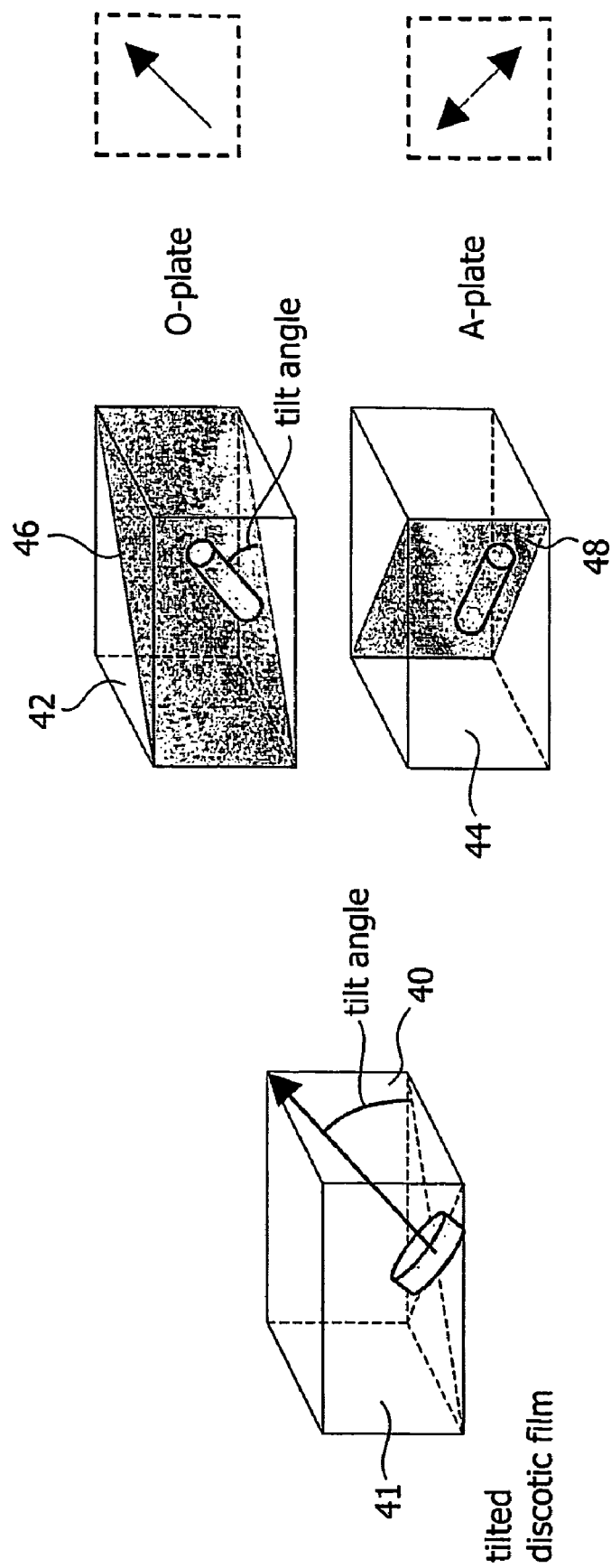
FIGS. 4a and 4b illustrate schematically the tilt of a director molecule within the retarder of a display device according to the first aspect of the present invention.

Referring to FIGS. 4a and 4b, different tilt angles of director molecules are shown. In FIG. 4a the tilt angle 40 in a tilted discotic layer 41 of negative ?n material is illustrated.

In FIG. 4b a combination of two possible ?n material layers 42, 44 is shown. The layers 42, 44 have crossed optical axes 46, 48. Layer 42 is an O-plate, i.e., the optical axis 46 is tilted in the same direction as the optical axis shown in FIG. 4a, and layer 44 is an A-plate having a planar optical axis 48. The retardation properties of the single layer 41 illustrated in FIG. 4a, and the combined layers 42, 44 are similar (see P. van de Witte et al, JPN. J. APPL. Phys. Vol. 39, pp. 101-108 (2000)).

Figure 5:
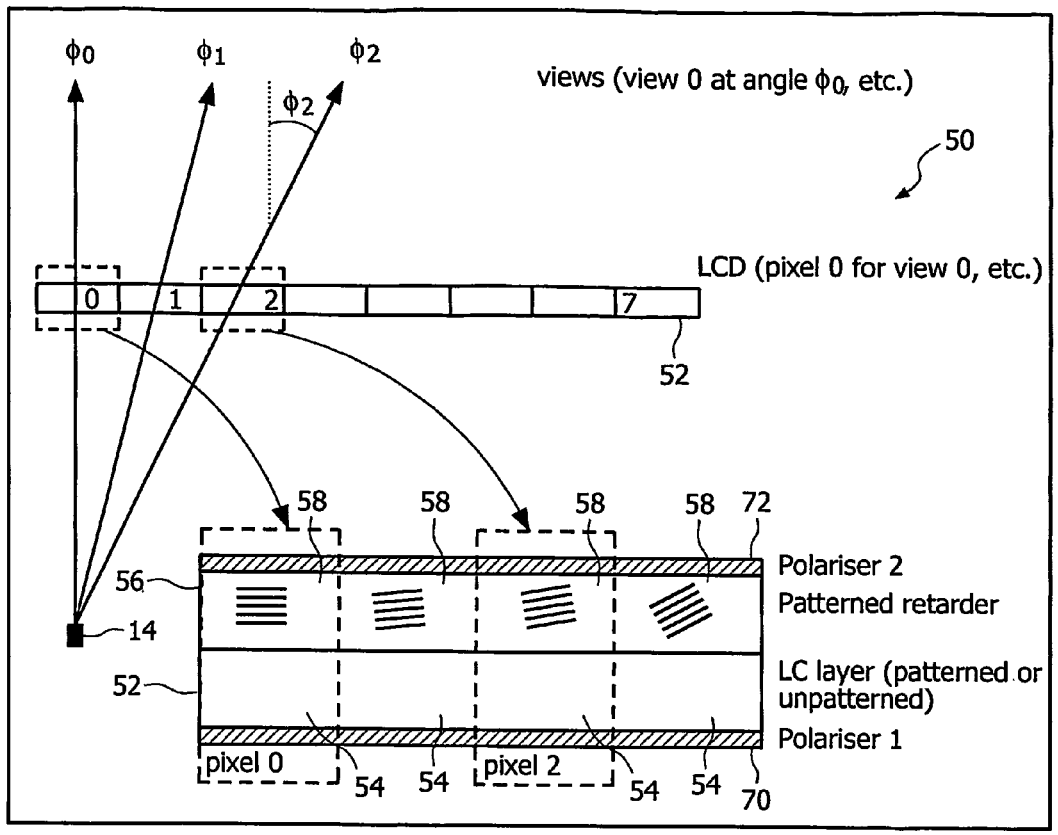
FIG. 5 is a schematic representation of an embodiment of a display device according to a first aspect of the present invention in which the tilt angle of the director molecules in the retarder has been varied as a function of the viewing angle of the corresponding pixel in the display panel forming part of the display device according to the first aspect of the present invention.

Referring now to FIG. 5, an embodiment of the invention in which the tilt angle of the pixel molecules is varied as function of the viewing angle of the associated pixel in the display panel is shown. The display device 50 comprises a liquid crystal layer 52 which may be patterned or unpatterned. The liquid crystal layer comprises a plurality of pixels 54. The device further comprises a retarder 56 comprising retarder pixels 58. The retarder is in optical association with the liquid crystal display panel 52. In the embodiment illustrated in FIG. 5 each retarder pixel 58 is associated with a corresponding pixel 54 in the display panel 52. The tilt angle of the director molecules in each retarder pixel 58 is varied as a function of the viewing angle φ associated with the corresponding pixel 54 in the display panel 52. FIG. 5 shows schematically the viewing angle φ for each of the pixels pixel 0, pixel 1, pixel 2 etc.

As shown in FIG. 5, the tilt angle of the director molecules in the retarder pixels 58 may therefore be varied on a pixel by pixel basis in order to improve the image quality of the 3D display 50.

The tilt of the molecules in the retarder pixel is chosen so that the shift in polarisation state is greater at lower viewing angles. This means that the combined action of the LC layer and retarder on the polarisation state of the light passing through these layers becomes more equal compared to the conventional case of a homogeneous retarder. The result is that the transmission versus voltage curves shown in FIG. 3 are now similar for the different views/viewing angles. This has the effect of reducing variation in intensity at different viewing angles and therefore improves quality of image at oblique viewing angles.

The display device 50 further comprises polarisers 70, 72.

It is to be understood that the dashed rectangles do not represent any physical structures in the display device 50; they are drawn for visualisation purposes only.

Figure 6:
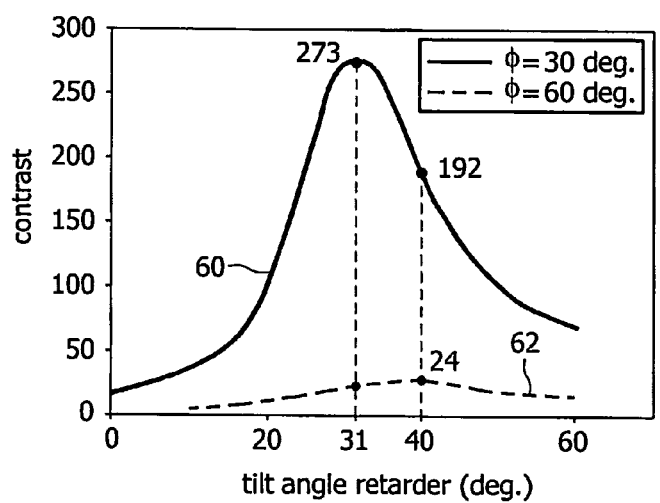
FIG. 6 shows the relationship between contrast and tilt angle of the retarder pixels at two viewing angles.

The performance of the display device 50 is shown in FIG. 6.

FIG. 6 shows the relationship of contrast of the display panel 52 having a patterned retarder 56 for two views. Solid line 60 represents a view at φ=30 degrees, and the dashed line 62 represents a view at φ=60 degrees. The contrast at these two viewing angles is plotted as a function of the tilt angle of the retarder 56.

It can be seen that if, for example, the tilt angle of the director molecules of all retarder pixels 58 were set at 40 degrees for all pixels, then the contrast at viewing angles 30 degrees and 60 degrees would be 192 and 24 respectively.

By means of the present invention, the tilt angle of the retarder may be varied on a pixel by pixel basis. This means that, for example, the tilt angle for the pixel that creates the view at Φ=30 degrees may be set at 31 degrees. This improves the contrast at Φ=30 degrees from 192 to 273. In addition, this does not affect the contrast of any other pixels 54 forming part of the display panel 52.

By means of the present invention therefore, the contrast for each pixel in each pixel 54 in the display panel 52 may be improved without effecting the contrast of any of the other pixels.

The display device used to provide the results shown in FIG. 6 comprises an optical stack having the following layers from top to bottom:

Polariser, transmission axis oriented at 90 degrees (the horizontal axis is defined as 0 degrees).

O-plate under 270 degrees with tilt angle varied by 0 to 60 degrees. The retardation of the O-plate is d?n=+110 nm.

A-plate under 0 degrees. The retardation of the A-plate is d?n=+110 nm.

Liquid crystal layer: Director molecules in a bottom substrate at 90 degrees; director molecules in a top substrate at 0 degrees (90 degrees twist). Pretilt liquid crystal layer 2.5 degrees at both substrates. Liquid crystal material: ZLI-4792. Retardation of the liquid crystal layer is d?n=475 nm Polariser at 0 degrees.

The viewing angle φ is defined to be a horizontal viewing angle (azimuthal angle always 0). The contrast is defined as the transmission in white state (liquid crystal addressed with voltage of 4.5 V) divided by the transmission in the black state (driving voltage 1.5 V).

Figure 7:
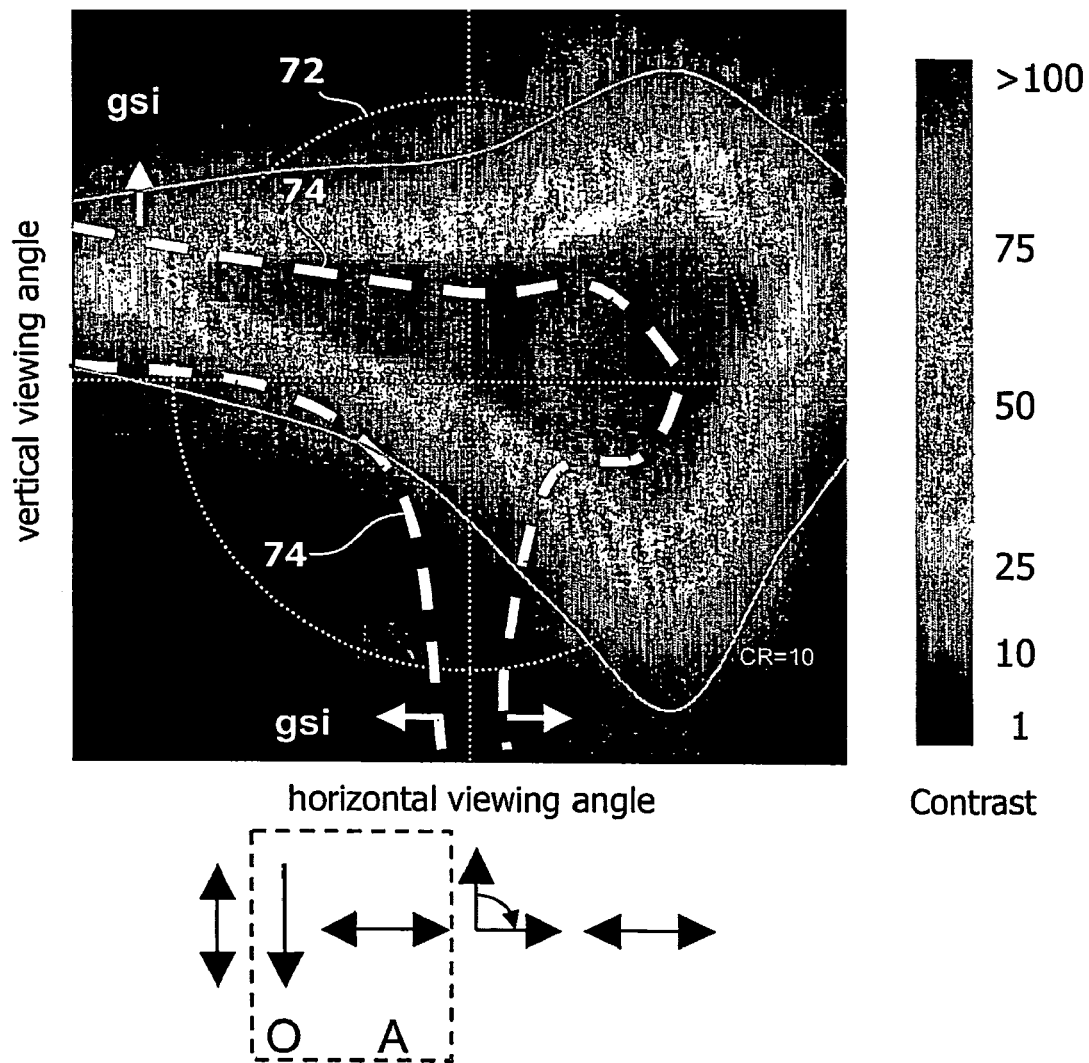
FIG. 7 shows a graph of viewing angle properties for a conventional LCD display comprising a homogeneous retarder.

FIG. 7 is an illustration of the contrast of this liquid crystal device as a function of viewing angle for an O-plate tilt angle of 30 degrees.

It can be seen from FIG. 7 that the image quality of a conventional LCD display with a homogeneous retarder strongly depends upon viewing angle. The graph 70 shows horizontal viewing angles along the horizontal axis, and vertical viewing angles along the vertical axis. Both the horizontal and vertical viewing angles range from −60 degrees to +60 degrees. The dotted circle 72 denotes the polar angle of 45 degrees. The different regions (shown on a false colour scale) show contrast values, and the dashed line 74 indicates the regions where grey scale inversion (gsi) occurs. Below the main graph shown in FIG. 7, the orientation of the optical axes of the various optical layers in the conventional liquid crystal display are shown schematically.

The invention claimed is:

1. A display device for displaying a three dimensional image such that different views are displayed according to different viewing angles, the display device including:
   a display panel having a plurality of separately addressable pixels for displaying said image, the pixels being grouped such that different pixels in a group correspond to different views of the image; and
   a retarder in optical association with the display panel, the retarder comprising a plurality of separately controllable retarder pixels, each retarder pixel being associated with at least one corresponding pixel in the display panel;
   wherein at least one optical parameter of each retarder pixel is varied as a function of viewing angle relative to the at least one corresponding pixel in the display panel.

2. The display device according to claim 1 in which one retarder pixel of the plurality of retarder pixels is associated with one pixel in the display panel.

3. The display device according to claim 1 wherein one retarder pixel of the plurality of retarder pixels is associated with a plurality of corresponding pixels in the display panel.

4. The display device according to claim 1 wherein each retarder pixel of the plurality of retarder pixels is associated with a single corresponding pixel in the display panel.

5. The display device according to claim 1 wherein the retarder is positioned in front of the display panel.

6. The display device according to claim 1 wherein the retarder is positioned behind the display panel.

7. The display device according to claim 1 wherein the thickness of the retarder is varied as a function of the viewing angle associated with the at least one corresponding pixel in the display panel.

8. The display device according to claim 1 wherein orientation of director molecules that constitute the retarder pixels is varied as a function of viewing angle associated with the at least one corresponding pixel in the display panel.

9. The display device according to claim 8 wherein tilt angle of the retarder pixels is varied as a function of viewing angle associated with the at least one corresponding pixel in the display panel.

10. The display device according to claim 8 wherein azimuthal angle of the retarder pixels is varied as a function of viewing angle associated with the at least one corresponding pixel in the display panel.

11. The display device according to claim 8 wherein splay and bend profile of the retarder pixels is varied as a function of viewing angle associated with the at least one corresponding pixel in the display panel.

12. The display device according to claim 1 wherein refractive indices of the retarder pixels are varied as a function of viewing angle associated with the at least one corresponding pixel in the display panel.

13. The display panel according to claim 12 wherein birefringence of the retarder pixels is varied as a function of viewing angle associated with the at least one corresponding pixel in the display panel.

14. The display device according to claim 1 wherein more than one optical parameter is varied in one or more of the retarder pixels.

15. The display device according to claim 1 wherein different optical parameters are varied in each retarder pixel.

16. The display device according to claim 1 wherein the same optical parameter is varied in each retarder pixel.

17. The display device according to claim 1 wherein the retarder pixels comprise all of the pixels in the retarder.

18. The display device according to claim 1 wherein the retarder pixels comprise some, but not all of the pixels in the retarder.

19. A method for displaying a three dimensional image on a display device comprising a retarder including a plurality of separately controllable retarder pixels, the method comprising:
   displaying an image on a plurality of separately addressable pixels in a display panel, the pixels being grouped such that different pixels in a group correspond to different views of the image; and
   altering the displayed image by varying at least one optical parameter of at least one retarder pixel as a function of viewing angle associated with a pixel of the display device.

20. The method according to claim 19
   wherein the displayed image is altered by varying a plurality of optical parameters associated with the plurality of retarder pixels.

21. The display device of claim 1, wherein a contrast of each pixel of the plurality of separately addressable pixels is changed without substantially affecting a contrast of any other pixel of the plurality of separately addressable pixels.

22. The display device of claim 1, wherein said altering comprises changing a contrast of each pixel of the plurality of separately addressable pixels without substantially affecting a contrast of any other pixel of the plurality of separately addressable pixels.

* * * * *